UNITED STATES PATENT OFFICE 2,542,984

METHOD OF SOLUBILIZING KERATIN

Charles H. Binkley, Berkeley, Calif., assignor to the United States of America as represented by the Secretary of Agriculture No Drawing. Application February 25, 1949, Serial No. 78,455

8 Claims. (Cl. 260—123.7)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to high molecular weight proteins derived from keratin-containing materials, and has among its objects the provision of such keratin derivatives and processes for their preparation. Other objects will be apparent from the description of the invention.

I have found that high molecular weight proteinaceous products, derived from keratin-containing materials, can be prepared by a simple process. According to this process, a reaction mixture containing a keratin-containing material, an alcohol, water, and an acid, is heated at a temperature of about from 100° C. to 150° C., preferably from 110° C. to 150° C., the alcohol and the water being present in the proportion of about from 0.25 to 3.0 volumes of alcohol per volume of water, preferably in the proportion of from about 0.4 to about 1 volume of alcohol per volume of water, and the acid being present in sufficient quantity to give a final pH of about from 2.5 to 4.0 at the conclusion of the reaction. As a result, a reaction occurs whereby a high molecular weight, solubilized keratin derivative is formed.

In isolating the formed derivative, the reaction mixture is filtered to remove undispersed material, and the filtrate thereafter treated in any of a number of ways, to be described hereinafter, to precipitate the derivative and recover it.

The derivative may be called gel-keratin because of its property of forming a gel when a hot aqueous alcohol solution thereof is cooled.

The following examples are illustrative of the invention.

Example I

A solution containing 19.1 lbs. of ethylene glycol monoethyl ether, 46.5 lbs. water, and 35 ml. of 98% sulphuric acid was heated to 70° C. The hot solution was poured over 8 lbs. of feathers contained in a jacketed autoclave equipped with a stirring device. The autoclave was sealed and steam at 95 lbs. pressure introduced in the jacket. The contents of the autoclave were heated to 138° C. and maintained at that temperature for 30 minutes while stirring continuously. The autoclave was then cooled by running cold water through the jacket until the contents reached 90° C. The autoclave was opened and the reaction mass was filtered through cheesecloth. The solid material remaining on the cloth may be re-treated as were the original feathers, or it may be used as fertilizer. To the filtrate containing the solubilized keratin was added, with stirring, 3 gals. of cold water containing 10 grams of sodium hydroxide. The suspension had a pH of 5.8. Twenty-five pounds of chopped ice was added with continued stirring. By this treatment the solubilized keratin was precipitated and was separated by filtration. The precipitate was pressed to remove excess liquid, then dried in a vacuum oven at 60° C. The dry product was ground and was then ready for use in preparation of fibers, films, sizes, adhesives, and so forth. The yield of dry solubilized keratin was 5.5 lbs. By reworking the insoluble residue from the digestion, an additional 1.25 lbs. of solubilized keratin was obtained.

Example II

A solution was prepared containing 4 gals. water, 4 gals. 95% ethyl alcohol, and 100 ml. concentrated hydrochloric acid. This solution was added to 8 lbs. of feathers contained in a jacketed autoclave equipped with an agitator. The autoclave was sealed and steam at 95 lbs. pressure introduced into the jacket. The contents of the autoclave were heated to 114° C. and maintained at that temperature for 3 hours while stirring continuously. The autoclave was then cooled by running cold water through the jacket until the contents reached 80° C. The autoclave was then opened and the reaction mass was filtered through cheesecloth. To the filtrate containing the solubilized keratin was added 20 grams of sodium hydroxide in 3 gals. of cold water. The suspension was cooled in a refrigerator to about 20° C. and then the solubilized keratin which had precipitated was separated by filtration. The precipitate was pressed and dried in a vacuum oven at 60° C. Yield was 6 lbs. of the dry solubilized keratin.

Example III

A mixture of 36 ml. of 1 normal hydrochloric acid, 80 ml. of ethylene glycol monoethyl ether, 84 ml. of water, and 20 grams of hog hair was heated in a sealed vessel for 3.5 hours at 120° C. The reaction mixture was cooled to about 90° C.

and filtered. The filtrate was diluted with equal volume of water and sufficient sodium hydroxide to obtain a pH of 5.8. The precipitated keratin was separated by filtration and dried. A yield of 12 grams was obtained.

*Example IV*

A solution was prepared containing 4 gals. water, 4 gals. methyl alcohol, and 75 ml. concentrated hydrochloric acid. This solution was added to 6 lbs. of feathers contained in a jacketed autoclave equipped with an agitator. The autoclave was sealed and steam at 95 lbs. pressure was introduced into the jacket. The contents of the autoclave were heated to 112° C. for 3 hours while stirring continuously. The autoclave was then cooled by running water through the jacket until the contents reached 80° C. The autoclave was then opened and the reaction mass was filtered through cheesecloth. To the filtrate containing the solubilized keratin was added 3 gals. of cold water and sufficient sodium hydroxide to adjust the pH to 5.8. A large quantity of chopped ice was added to reduce the temperature of the suspension to about room temperature and the precipitated protein product filtered off and dried in a vacuum oven at about 60° C. A yield of 4.2 lbs. of the dry protein product was obtained.

Essentially, the process of this invention involves heating the keratin-containing material with water and an alcohol under acid conditions. This treatment results in breaking of the hydrogen bonding of the less highly oriented components of the keratin. Thus, the product formed has greater solubility and plasticity than the original keratin, and can be applied to many practical uses. This is in contrast to the original keratin which is insoluble and has very low plasticity.

Many different raw keratin-containing materials, such as feathers, animal hoof, animal hair, animal horn, animal hide, snake skin, and so forth, are adapted to be treated according to this invention. It has been found that poultry feathers give the highest yields of gel-keratin. White poultry feathers are useful to obtain a light-colored product in high yield.

The alcohol used serves two primary functions—first as a negative catalyst to suppress splitting of peptide linkages, and second as a solvent to dissolve the gel-keratin formed by the breaking of the hydrogen bonds in the original keratin. The mere heating of keratin with water and acid would cause not only the breaking of hydrogen bonds and salt linkages, but also would cause extensive splitting of peptide linkages whereby a low molecular weight product would be obtained. The action of the alcohol is to promote breaking of hydrogen bonds and salt linkages and to suppress splitting of peptide linkages.

Many different alcohols may be used in the process, the term "alcohol" being used herein in its broad sense to designate a neutral, normally-liquid, water-soluble, organic compound containing a hydroxy group attached to an aliphatic carbon atom. Thus, the following are examples of alcohols which may be used: methanol, ethanol, propanol-1, propanol-2, tertiary butanol, butanol-1, allyl alcohol, tetrahydrofurfuryl alcohol, ethylene glycol, propylene glycol, glycerol, ethylene glycol monomethyl ether, ethylene glycol monoethyl ether, ethylene glycol monopropyl ether, ethylene glycol monobutyl ether, diacetone alcohol, and so forth. Further, mixtures of alcohols can be used instead of individual solvents. Thus, a mixture of propanol-1 and butanol-1 gives good results.

The proportion of keratin-containing material to treating solution (alcohol and water) may be varied within wide limits. In general, it is desirable to make this proportion as high as possible in order to conserve alcohol. However, the proportion cannot be increased indefinitely because of formation of too viscous a reaction mixture which makes isolation of the product difficult. In most cases, the upper limit is about 1 lb. of keratin per gal. of treating solution. The proportion can be decreased below this value as much as desired realizing that as the proportion is decreased, more alcohol will be needed to solubilize the same amount of keratin.

The amount of acid to be used is controlled by the amount of keratin-containing material being treated. Since part of the acid is used up in the course of the reaction, it is usually advisable to run small batches of reaction with different amounts of acid to determine the amount of acid necessary to obtain the proper final pH. In the case of feathers, about 0.2 to about 0.6 gram equivalents of acid per kilogram of keratin-containing material gives good results. Various acids can be used, the obtaining of the proper pH being the sole desideratum. For example, sulphuric acid, hydrochloric acid, phosphoric acid, acetic acid, and so forth, are suitable.

The preferred range of temperature for treating the keratin-containing material is from about 110° C. to 150° C. To prevent loss of solvent, it is preferred to conduct the reaction in a sealed vessel, such as an autoclave, which can resist the pressure created. Such heating under pressure in a sealed vessel may be referred to as heating under autogenous pressure.

The time of reaction is, of course, dependent on many factors, such as the type of keratin material being treated, alcohol used, temperature, and so forth. For example, in the case of treatment of feathers with aqueous acidic alcohol in the proportion of one lb. feathers per gallon of aqueous alcohol (equal volumes of water and alcohol), the following ranges of time give good results:

| Temp., °C. | Time |
|---|---|
| 110 | 2½ to 5 hrs. |
| 116 | 1 to 3 hrs. |
| 138 | 20 min. to 1 hr. |
| 150 | not over ½ hr. |

These ranges of time of reaction are not limits of operative conditions but represent examples yielding good results.

It has been found that a single treatment of the keratin-containing material with the aqueous acidic alcohol gives good yields (75–90%) of the protein product. However, it is often advantageous to re-treat the undispersed material to obtain further yields of the desired product if the yield for the single treatment is less than about 85 to 90%.

After heating the keratin-containing material with the water and alcohol under acid conditions and filtering to remove undispersed material, the protein product is present dissolved in the water-alcohol phase. The protein may be recovered in many different ways from this liquid phase. Addition of a salt (for instance, sodium sulphate, sodium sulphite, magnesium sulphate, lithium chloride, ammonium thiocyanate, and so forth) will precipitate the protein. Likewise, precipitation can be obtained by addition of an acid, for example, sulphuric, hydrochloric, trichloracetic, and so forth. Another method of isolation involves dialysis or electrodialysis of the solution against water. The protein can also be precipitated by adding water to reduce the proportion of alcohol to water to less than 0.25 volume alcohol per volume of water; preferably enough water is added to reduce the proportion to about 0.177 volume of alcohol per volume of water. Another method of precipitating the protein product involves adding an alkaline material to adjust the pH of the reaction mixture within the range from about 5 to about 7, preferably 5.8. For this adjustment one may use any of the common alkaline materials, such as sodium hydroxide, ammonium hydroxide, potassium hydroxide, sodium carbonates, potassium carbonates, carbonates of ammonia, calcium hydroxide, and so forth. The protein product can also be precipitated by cooling the reaction solution to below about 46° C., preferably to room temperature. This cooling of the reaction mixture has an important effect of making a more soluble product. Generally, I prefer to cool the reaction mixture, immediately after filtering, to about 20° C. This rapid cooling immobilizes the molecules in the condition in which they exist in solution and prevents inter- and intra-molecular hydrogen bonding which would form more insoluble derivatives, thereby preserving the molecular structure of the solubilized protein and preventing its developing insolubility. For practical purposes I generally prefer to isolate the product by utilizing all three precipitation means—dilution with water, adjustment of pH, and cooling. By this technique the protein is precipitated in granular form, having a low moisture content, and is easily filtered as it does not clog the filter pores. To this end, the reaction mixture, immediately after filtering to remove undispersed material, is diluted with water to reduce the proportion of alcohol to water to less than 0.25 volume per volume of water, preferably 0.177 volume alcohol per volume of water; the pH adjusted to about 5 to about 7, preferably 5.8; and the temperature reduced to below about 46° C., preferably 20° C. by the use of ice or by placing the mixture in refrigerated storage.

After obtaining the protein product in precipitated form, residual solvent and water are removed by drying. Evaporation under reduced pressure at about 60° C. or below is preferred, although with low-boiling alcohols, the drying may be accomplished by simply allowing the precipitate to be exposed to air at room temperature.

The protein product obtained according to this invention contains about 15% nitrogen and about 3% sulphur. Chemical and physical tests have shown that the product is not keratin. For instance, the product of this invention is completely digestible by pepsin and trypsin and is soluble in 50% aqueous alcohol upon warming. Keratin is not digestible by pepsin nor trypsin, nor is it soluble in warm aqueous alcohol. The natural keratins exhibit negligible plastic flow even with large amounts of plasticizer. The product produced herein can be molded without addition of any plasticizer and shows true flow under high temperature and pressure in standard flow-testing equipment. A solution of the product of this invention in alcohol will, upon standing, form a thin film on the surface thereof. This is an indication of the high molecular weight of the product.

A unique property of the products of this invention is their property of forming gels. These gels have characteristic gelation points. The gelation point is determined by slowly cooling the liquid phase containing the protein. At the gelation point, the liquid becomes opaque and sooner or later thereafter sets to a firm gel. The gelation characteristics of the product of this invention in different alcohols are shown in the following table:

Table 1

[Gelation points at pH 7.2, gel-keratin concentration—15 g. per 100 ml., equal volumes of alcohol and water]

| Alcohol | Gelation point |
|---|---|
|  | °C. |
| Ethanol | 60 |
| Isopropanol | 45 |
| Propanol | 31 |

The protein product of this invention has many uses. It may be added to poultry and livestock feeds to provide additional protein nutrient material needed by the organism. The protein can be molded upon application of heat and pressure, without requiring additional plasticizer, to form a horny material resembling keratin in physical properties and solubility. Thus, many types of articles, such as fountain pen barrels, ashtrays, serving trays, container closures, buttons, electrical equipment, and so forth, can be fabricated from the protein product. Sizes can be prepared by dissolving the protein in aqueous alkali or the liquid obtained after filtration may be used directly as a size or adhesive. The product can be used as a microbiological growth medium or as extenders for thermosetting resins or as setting retardants for plaster of Paris, and so forth. The gels formed by cooling an aqueous alcohol solution of the product can be used for hectograph bases or for production of printing rolls or blankets. In some case, the filtration to remove undispersed material can be eliminated and the product mixed with undispersed material can be used as a feed component or as an extender for molding resins.

Having thus described the invention, what is claimed is:

1. A process of preparing a high molecular weight, solubilized keratin derivative having the property of forming a gel when a hot aqueous-alcohol solution thereof is cooled, comprising heating a reaction mixture containing a keratin-containing material, a neutral, normally-liquid, water-soluble alcohol consisting of carbon, hydrogen, and oxygen, water, and and acid at a temperature of about from 100° C. to 150° C., said alcohol and water being present in the proportion of about from 0.25 to 3.0 volumes of alcohol per volume of water and said acid being present in sufficient quantity to give a final pH of about from 2.5 to 4.0 at the conclusion of the reaction, thereby to produce said keratin derivative.

2. A process of preparing a high molecular weight, solubilized keratin derivative having the property of forming a gel when a hot aqueous-alcohol solution thereof is cooled, comprising heating a reaction mixture containing a keratin-containing material, a neutral, normally-liquid, water-soluble alcohol consisting of carbon, hydrogen, and oxygen, water, and an acid at a temperature of about from 100° C. to 150° C., said alcohol and water being present in the proportion of about from 0.25 to 3.0 volumes of alcohol per volume of water and said acid being present in sufficient quantity to give a final pH of about from 2.5 to 4.0 at the conclusion of the reaction, thereby to form said keratin derivative, and isolating the formed derivative.

3. A process of preparing a high molecular weight, solubilized keratin derivative having the property of forming a gel when a hot aqueous-alcohol solution thereof is cooled, comprising heating a reaction mixture containing a keratin-containing material, a neutral, normally-liquid, water-soluble alcohol consisting of carbon, hydrogen, and oxygen, water, and an acid at a temperature of about from 100° C. to 150° C., said alcohol and water being present in the proportion of about from 0.25 to 3.0 volumes of alcohol per volume of water and said acid being present in sufficient quantity to give a final pH of about from 2.5 to 4.0 at the conclusion of the reaction, thereby to form said keratin derivative, filtering the reaction mixture to remove undispersed material and immediately thereafter cooling the filtrate to below about 46° C. to precipitate the keratin derivative, and recovering the derivative.

4. A process of preparing a high molecular weight, solubilized keratin derivative having the property of forming a gel when a hot aqueous-alcohol solution thereof is cooled, comprising heating a reaction mixture containing a keratin-containing material, a neutral, normally-liquid, water-soluble alcohol consisting of carbon, hydrogen, and oxygen, water, and an acid at a temperature of about from 100° C. to 150° C., said alcohol and water being present in the proportion of about from 0.25 to 3.0 volumes of alcohol per volume of water and said acid being present in sufficient quantity to give a final pH of about from 2.5 to 4.0 at the conclusion of the reaction, thereby to form said keratin derivative, filtering the reaction mixture to remove undispersed material, adding sufficient water to the filtrate to reduce the proportion of alcohol to water to below 0.25 volume of alcohol per volume of water, thereby to precipitate the keratin derivative, and recovering the derivative.

5. A process of preparing a high molecular weight, solubilized keratin derivative having the property of forming a gel when a hot aqueous-alcohol solution thereof is cooled, comprising heating a reaction mixture containing a keratin-containing material, a neutral, normally-liquid, water-soluble alcohol consisting of carbon, hydrogen, and oxygen, water, and an acid at a temperature of about from 100° C. to 150° C., said alcohol and water being present in the proportion of about from 0.25 to 3.0 volumes of alcohol per volume of water and said acid being present in sufficient quantity to give a final pH of about from 2.5 to 4.0 at the conclusion of the reaction, thereby to form said keratin derivative, filtering the reaction mixture to remove undispersed material, diluting the filtrate with water to reduce the proportion of alcohol to water to less than 0.25 volume of alcohol per volume of water, adjusting the pH to between about 5 and 7, and cooling the filtrate to below about 46° C., thereby causing precipitation of the keratin derivative, and recovering the derivative.

6. The process of claim 1 wherein the alcohol is ethylene glycol monoethyl ether.

7. The process of claim 1 wherein the alcohol is methanol.

8. The process of claim 1 wherein the alcohol is ethanol.

CHARLES H. BINKLEY.

REFERENCES CITED

The following references are of record in the file of this patent:

UNITED STATES PATENTS

| Number | Name | Date |
|---|---|---|
| 1,846,356 | Pierson | Feb. 23, 1932 |
| 2,434,688 | Evans | Jan. 20, 1948 |

OTHER REFERENCES

Fraenkel-Conrat et al.: Jour. Biol. Chem. (Nov., 1945), vol. 161, pp. 259 to 268.